(12) United States Patent
Durairaj et al.

(10) Patent No.: US 12,154,182 B1
(45) Date of Patent: Nov. 26, 2024

(54) IMPACT ANALYSIS OF PROPERTY

(71) Applicant: United Services Automobile Association (USAA), San Antonio, TX (US)

(72) Inventors: Ravi Durairaj, San Antonio, TX (US); Rachel Michelle Ballew, San Antonio, TX (US); Natalie Kay Helsen, Murphy, TX (US); Eric David Schroeder, San Antonio, TX (US); Amber Nicole Sodikov, Plano, TX (US); David Joaquin Harris, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 126 days.

(21) Appl. No.: 17/824,689

(22) Filed: May 25, 2022

Related U.S. Application Data

(60) Provisional application No. 63/193,445, filed on May 26, 2021.

(51) Int. Cl.
   *G06Q 30/00* (2023.01)
   *G06Q 50/163* (2024.01)
(52) U.S. Cl.
   CPC .................................. *G06Q 50/163* (2013.01)

(58) Field of Classification Search
   None
   See application file for complete search history.

(56) References Cited

U.S. PATENT DOCUMENTS

| | | | |
|---|---|---|---|
| 2013/0197873 A1* | 8/2013 | Lee | G06F 30/00 703/1 |
| 2013/0322966 A1* | 12/2013 | Nettles | E02B 3/102 405/21 |
| 2015/0170288 A1* | 6/2015 | Harton | G06Q 40/08 705/4 |
| 2015/0235153 A1* | 8/2015 | Du | G06Q 10/0635 705/7.28 |
| 2018/0182041 A1* | 6/2018 | Sheridan | G06F 16/29 |
| 2020/0098052 A1* | 3/2020 | King | G06Q 40/08 |
| 2023/0109409 A1* | 4/2023 | Strong | G06V 20/176 705/313 |

\* cited by examiner

*Primary Examiner* — Matthew T Sittner
(74) *Attorney, Agent, or Firm* — Fletcher Yoder, P.C.

(57) ABSTRACT

A central management system includes one or more processors configured to receive mapping data associated with a target property, identify, via machine learning, a geographic characteristic of interest specific to the target property, determine a modification of the geographic characteristic based on the mapping data, identify an impact of the modification to the target property, and provide an indication of the impact via a graphical user interface.

20 Claims, 14 Drawing Sheets

IMPACT ANALYSIS OF PROPERTY

CROSS-REFERENCE TO RELATED APPLICATION

This application claims priority to and the benefit of U.S. Provisional Application No. 63/193,445, entitled "IMPACT ANALYSIS OF PROPERTY," filed May 26, 2021, which is hereby incorporated by reference in its entirety for all purposes.

BACKGROUND

Property, such as real property, may be defined by boundaries and objects on the property. Property owners may be unaware of the boundaries or changes to the property, such as changes to the boundaries, new objects on the property, and changes in topography. The boundaries and changes to the property may affect a value of the property and rights of the property owners, particularly when selling the property. Additionally, rights of buyers of the property may be affected. It is now recognized that there is a need to analyze and communicate such aspects of the property to interested parties.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a central management system includes one or more processors configured to receive mapping data associated with a target property, identify, via machine learning, a geographic characteristic of interest specific to the target property, determine a modification of the geographic characteristic based on the mapping data, identify an impact of the modification to the target property, and provide an indication of the impact via a graphical user interface.

In certain embodiments, a method includes receiving mapping data associated with a target property, identifying, via machine learning, a geographic characteristic of interest specific to the target property, determining a modification of the geographic characteristic based on the mapping data, identifying an impact of the modification to the target property, and providing an indication of the impact via a graphical user interface.

In certain embodiments, a non-transitory computer-readable medium including computer readable instructions, that when executed by one or more processors, causes the one or more processors to perform operations including receiving mapping data associated with a target property, identifying, via machine learning, a geographic characteristic of interest specific to the target property, determining a modification of the geographic characteristic based on the mapping data, identifying an impact of the modification to the target property, and providing an indication of the impact via a graphical user interface.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
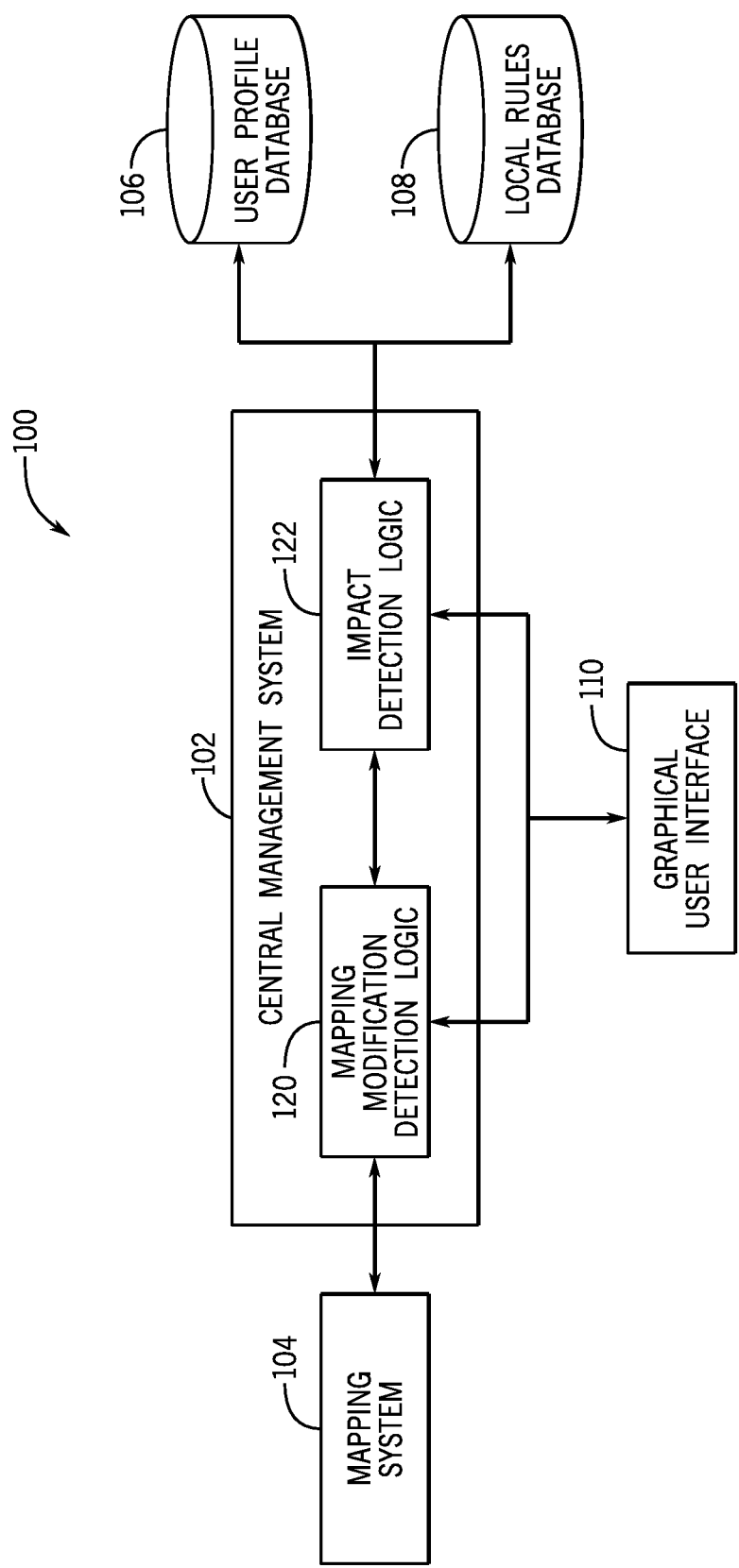
FIG. 1 illustrates a block diagram of an impact analysis system including a central management system configured to determine, analyze, and address an impact to a target property, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to an impact analysis system, and more particularly to a central management system of the impact analysis system that analyzes mapping data associated with a target property (e.g., real property) and identifies, via machine learning, a geographic characteristic of interest specific to the target property. The central management system determines a modification of the geographic characteristic based on the mapping data and identifies an impact of the modification to the target property. The central management system then provides an indication of the impact via a graphical user interface, such as by providing a notification or an updated version of a map indicating the modification.

Examples of geographic characteristics of interest include, but are not limited to, a surface topography of the target property, an underground mapping of the target property, a waterfront portion of the target property, a fence line, a structure, a yard, a field, tree(s), and other characteristics that may affect a value of the target property and/or rights of an owner or prospective owner of the target property. Examples of modifications of the geographic characteristic of interest include, but are not limited to, movement of the geographic characteristic on and/or near the target property, detection of non-visible and/or underground portions of the target property, incorrect positioning of boundaries of the target property, and other suitable modifications.

The central management system may determine an impact of the modification to the target property to determine how the modification may affect the target property and/or rights of parties interested in the target property. For example, movement of an object and/or placement of a new object on the target property may affect a value of the target property and/or trigger a requirement for a new survey of the target property. Accordingly, the central management system may determine the impact to the target property, such as an adjusted value of the target property and/or the requirement for the new survey. The central management system may automatically display the adjusted value and/or send a request to perform the new survey. As described in greater detail below, the impact analysis system, via the central management system, may identify other geographic characteristics of interest, modifications of the geographic interests, and impacts of the modifications.

With the foregoing in mind, FIG. 1 is a block diagram of an impact analysis system 100 including a central management system 102, according to embodiments of the present disclosure. The impact analysis system 100 includes a mapping system 104, a user profile database 106, a local rules database 108, and a graphical user interface (GUI) 110, each of which are configured to communicate with the central management system 102. In certain embodiments, the central management system 102 may include one or more of the mapping system 104, the user profile database 106, the local rules database 108, and the GUI 110.

As illustrated, the central management system 102 includes a mapping modification detection logic 120 and an impact detection logic 122. The mapping modification detection logic 120 may communicate with the mapping system 104 to receive (e.g., retrieve) mapping data (e.g., maps, satellite imagery, footage/imagery captured by an aerial drone, photographs) and/or to control the mapping system 104, such as to instruct the mapping system 104 to perform additional mapping steps (e.g., generate additional mapping data). Additionally, the mapping modification detection logic 120 may identify, via machine learning, geographic characteristics of interest and modifications to the geographic characteristics of interest. Examples of machine learning are described in greater detail below. The mapping modification detection logic 120 may communicate the geographic characteristics of interest and the modifications to the impact detection logic 122 and/or to the GUI 110.

The impact detection logic 122 may communicate with the user profile database 106 and/or the local rules database 108. For example, the impact detection logic 122 may retrieve a user profile from the user profile database 106 based on an indication of a particular target property in mapping data received from the mapping modification detection logic 120. The user profile may include characteristics of the user, protection plans associated with a target property (e.g., insurance plans), features of the target property, a value of the target property, mortgage information related to the target property, certain mapping data related to the target property (e.g., blueprints, maps), and other aspects associated with the user and the target property. The user profile database 106 may store a plurality of user profiles with each user profile including information about a particular user and/or a particular target property. In certain embodiments, the impact detection logic 122 may update the user profile based on a determination of an impact to the target property, such as to update a value of the target property, update a protection plan (e.g., an asset protection plan), and to perform other updates (e.g., modifications, adjustments) within the user profile database 106.

The local rules database 108 may store information regarding local rules associated with the target property and/or that may affect the target property. The local rules may include zoning rules (e.g., restrictions regarding housing zones, industrial zones, commercial zones, and the like) and other laws, regulations, and rules that may affect the target property. The impact detection logic 122 may retrieve local rules from the local rules database 108 and may determine whether the target property is compliant with the local rules. For example, based on an initial set of mapping data received from the mapping system 104 and/or based on a modification detected by the mapping modification detection logic 120, the impact detection logic 122 may determine whether the target property is in compliance with the local rules. In response to determining that the target property is in compliance with the local rules, the impact detection logic 122 may update a record stored in the local rules database 108 and/or in the user profile database indicating that the target property is in compliance. Additionally or alternatively, the impact detection logic 122 may provide a notification, via the GUI 110, indicating that the target property is in compliance. In response to determining that the target property is not in compliance with the local rules, the impact detection logic 122 may update a record stored in the local rules database 108 and/or in the user profile database indicating that the target property is in not compliance. Additionally or alternatively, the impact detection logic 122 may provide a notification, via the GUI 110, indicating that the target property is in not compliance. In certain embodiments, the impact detection logic 122 may automatically initiate an action to put the target property in compliance with the local rules, such as to update an asset protection plan or to modify the target property (e.g., to modify the geographic characteristic of interest and/or to correct/undo the modification of the geographic characteristic of interest).

The GUI 110 may display information received by the mapping modification detection logic 120 and/or the impact detection logic 122, such as a map of the target property, a map of the target property updated to indicate the modification, an impact of the modification to the property, a map indicating a suggested additional modification to the property (e.g., to undo the initial modification, to add to the initial modification, to create a new modification), a notification of the modification, a notification suggesting that a new survey of the target property be performed and/or that the new survey has been requested, and other suitable maps and notifications.

Additionally, the GUI 110 may allow user interaction with the central management system 102. For example, the GUI 110 may allow a user to select, modify, and/or display a map associated with the target property and/or to select one or more options associated with a notification provided by the central management system 102. The GUI 110 may be displayed via a user device, such as a personal computer (e.g., a desktop or laptop), a smart phone, a smart watch, and so forth. In certain embodiments, the central management system 102, and/or the impact analysis system 100 generally, may include the user device. In certain embodiments, the central management system 102 may train and/or enhance a machine learning model based on the feedback from the user received via the GUI 110.

For example, some processes (e.g., identifying geographic characteristics of interest, determining modifications to the geographic characteristics of interest, determining impacts of the modifications) described above may be performed by machine learning circuitry using the mapping data, historical geographic data, and/or input from a user. The machine learning circuitry (e.g., circuitry used to implement machine learning algorithms or logic) may access the mapping data and the additional information to identify patterns, correlations, or trends associated with the data. The mapping data may be sourced from a multitude of diverse online services and databases, new data patterns not previously attainable based on mapping analysis without machine learning may emerge. As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task.

Depending on the inferences to be made, the machine learning circuitry may implement different forms of machine learning. In some embodiments, a supervised machine learning may be implemented. In supervised machine learning, the mathematical model of a set of mapping data contains both the inputs and the desired outputs. The set of mapping data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects (e.g. a geographic characteristic of interest between two sets of mapping data) are.

Additionally and/or alternatively, in some situations, it may be beneficial for the machine-learning circuitry to utilize unsupervised learning (e.g., when particular output types are not known). Unsupervised learning algorithms take a set of mapping data that contains only inputs, and find structure in the data, like grouping or clustering of mapping data. The algorithms, therefore, learn from test data that has not been labeled, classified or categorized. Instead of responding to feedback, unsupervised learning algorithms identify commonalities in the mapping data and react based on the presence or absence of such commonalities in each new piece of mapping data.

Cluster analysis is the assignment of a set of observations (e.g., mapping datasets) into subsets (called clusters) so that observations within the same cluster are similar according to one or more predesignated criteria, while observations drawn from different clusters are dissimilar. Different clustering techniques make different assumptions on the structure of the mapping data, often defined by some similarity metric and evaluated, for example, by internal compactness, or the similarity between users of the same cluster, and separation, the difference between clusters. Predictions or correlations may be derived by the machine learning circuitry. For example, groupings and/or other classifications of the mapping data may be used to identify potential modifications in the mapping data and impacts of the modifications. The predictions may be provided to downstream applications, which may perform actions based upon the predictions. The actions that are performed may be mediated through a controller, either directly or through a coupled secure system, that has access to the mapping data.

Figure 2:
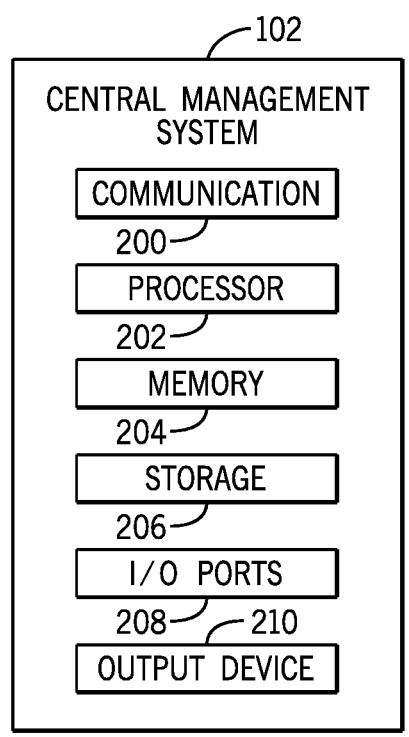
FIG. 2 illustrates a block diagram of components that may be part of the central management system of FIG. 1, in accordance with embodiments described herein.

FIG. 2 illustrates a block diagram of components that may be part of the central management system 102 of FIG. 1. For example, the central management system 102 may include a communication component 200, a processor 202, a memory 204, a storage 206, input/output (I/O) ports 208, an output device 210 (e.g., a display or a speaker), or any of a variety of other components that enable the central management system 102 to carry out the techniques described herein. The communication component 200 may be a wireless or wired communication component that may facilitate communication between the central management system 102, the mapping system 104, the user profile database 106, the local rules database 108, and the GUI 110.

The processor 202 may be any suitable type of computer processor or microprocessor capable of executing computer-executable code. The processor 202 may also include multiple processors that may perform the operations described below. The memory 204 and the storage 206 may be any suitable articles of manufacture that can serve as media to store processor-executable code, data, or the like. These articles of manufacture may represent computer-readable media (e.g., any suitable form of memory or storage) that may store the processor-executable code used by the processor 202 to perform the presently disclosed techniques. The memory 204 and the storage 206 may also be used to store the data, various other software applications, and the like. The memory 204 and the storage 206 may represent non-transitory computer-readable media (e.g., any suitable form of memory or storage) that may store the processor-executable code used by the processor 202 to perform various techniques described herein. It should be noted that non-transitory merely indicates that the media is tangible and not a signal.

The I/O ports 208 may be interfaces that may couple to other peripheral components such as input devices (e.g., keyboard, mouse), sensors, input/output (I/O) modules, and the like. The output device 210 may operate to depict indications associated with software or executable code processed by the processor 202. In one embodiment, the output device 210 may be an input device. For example, the output device 210 may include a touch display capable of receiving inputs from a user of the central management system 102. The output device 210 may be any suitable type of display, such as a liquid crystal display (LCD), plasma display, or an organic light emitting diode (OLED) display, for example. In one embodiment, the output device 210 may depict or otherwise provide the indications described above regarding the asset protection plans and adjustments to the asset protection plan. In certain embodiments, the output device 210 may include and/or may display the GUI 110.

It should be noted that the components described above with regard to the central management system 102 are exemplary components and the central management system 102 may include additional or fewer components as shown. Additionally, it should be noted that the mapping system 104 may also include similar components as described as part of the central management system 102. With the foregoing in mind, additional details with regard to determining an impact of a modification to a geographic characteristic of interest are discussed below with reference to FIG. 3.

Figure 3:
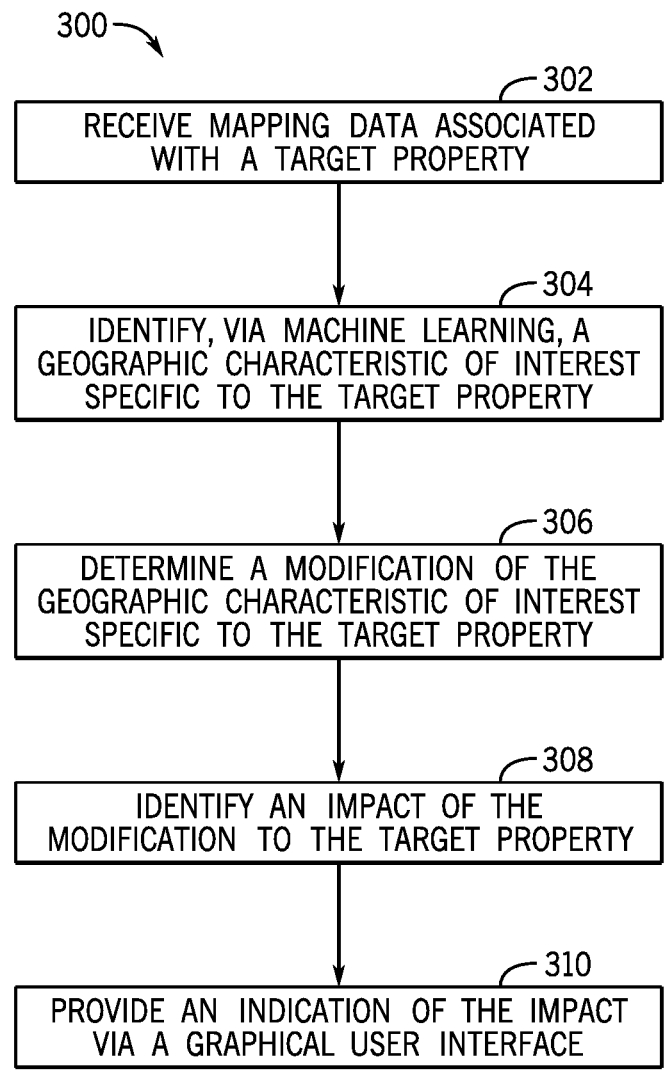
FIG. 3 illustrates a flow chart of a method for identifying an impact of a modification to a target property using the central management system of FIG. 1, in accordance with embodiments described herein.

For example, FIG. 3 illustrates a flow chart of a method 300 for identifying an impact of a modification to a target property using the central management system 102 of FIG. 1. The following description of the method 300 will be described as being performed by the central management system 102, but it should be noted that any suitable processor-based device may be specially programmed to perform any of the methods described herein. Moreover, although the following description of the method 300 is described as including certain steps performed in a particular order, it should be understood that the steps of the method 300 may be performed in any suitable order, that certain steps may be omitted, and/or that certain steps may be added.

At block 302, the central management system 102, via the mapping modification detection logic 120, may receive mapping data associated with a target property from the mapping system 104. The target property may be identified via user input (e.g., received via the GUI 110) and/or may be identified via another application. In certain embodiments, the central management system 102 may receive a request related to the target property and retrieve the mapping data from the mapping system 104 in response to receiving the request. In some embodiments, the central management system 102 may continuously retrieve and monitor/analyze the mapping data associated with the target property or may do so on a periodic basis (e.g., every second, every minute, hourly, daily, weekly, monthly, annually, every decade).

At block 304, the central management system 102 may identify, via machine learning and the mapping modification detection logic 120, a geographic characteristic of interest specific to the target property. The geographic characteristic of interest may include all or a portion of the target property and may be a characteristic that, if present, absent, and/or modified, may affect a value, status, and/or other aspect of the target property. The mapping modification detection logic 120 may include a machine learning model configured to detect the geographic characteristic of interest based on a type of the target property, features of the target property (e.g., types, a layout, and/or an amount of the features), a topography (e.g., a surface topography) of the target property, an underground mapping of the target property, and other aspects of the target property.

At block 306, the central management system 102, via the mapping modification detection logic 120, may determine a modification of the geographic characteristic based on the mapping data received from the mapping system 104. The modification may be a change between two sets of mapping data and/or an initial detection of one or more features of the target property (or an absence of such features). For example, the change between the two sets may be a natural change (e.g., a drop in water level of a natural shoreline) or a manmade change (e.g., a new structure built by someone on or near the target property). Additionally, the modification may be a detection of a feature on or near the target property that was previously unknown or an absence of such a feature. In certain embodiments, the modification may be identified (e.g., determined) via machine learning by the mapping modification detection logic 120.

At block 308, the central management system 102, via the impact detection logic 122, may identify an impact of the modification to the target property. For example, the impact detection logic 122 may receive an indication of the modification from the mapping modification detection logic 120 and determine the impact in response to the receiving the modification. Identifying/determining the impact may include determining a value of the target property, determining a need for a further modification of or related to the target property (e.g., that a new survey of the target property is required, that a fence line should be moved), and other determinations. In certain embodiments, identifying the impact may include generating a request to perform an action related to the modification, such as to perform the new survey, to generate a request related to zoning of the target property, and other actions.

In certain embodiments, the impact may be relative to an asset protection plan associated with the target property, such as homeowner's insurance. For example, the impact may be a greater or lesser risk of a homeowner filing a claim associated with the asset protection. Accordingly, the central management system 102 may adjust a premium and/or a deductible of the asset protection based on the impact.

Figure 6:
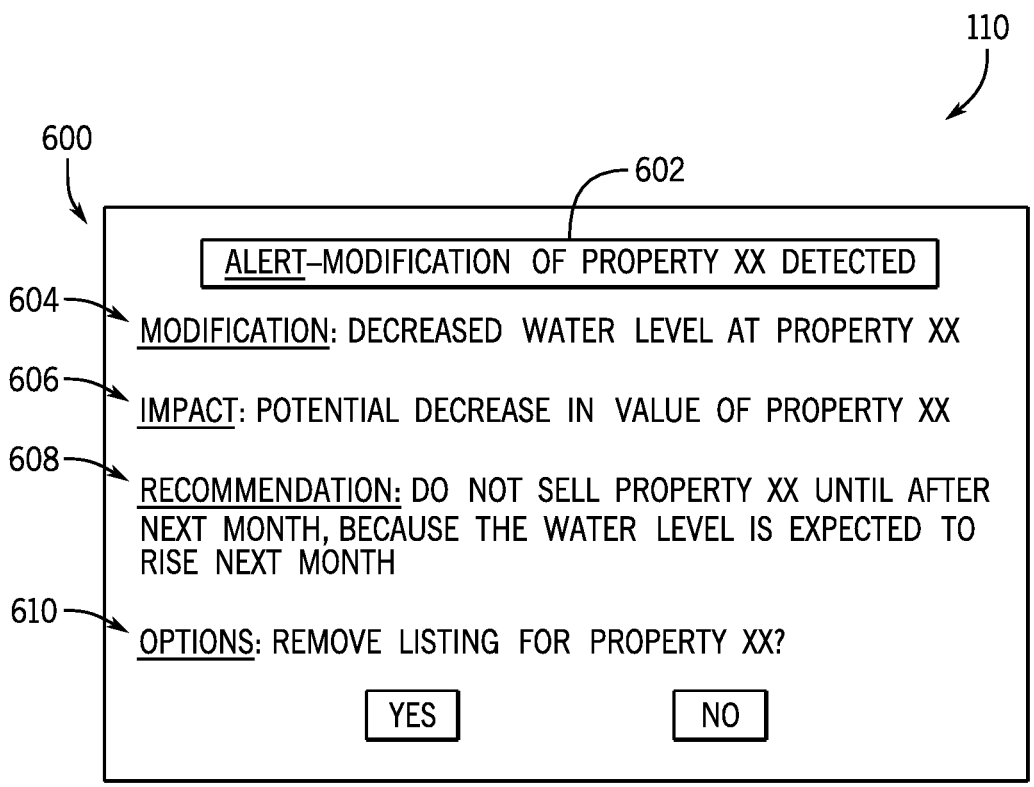
FIG. 6 illustrates a graphical user interface that may be generated by the central management system of FIG. 1 to provide a notification related to the target property of FIGS. 4 and 5, in accordance with embodiments described herein.

At block 310, the central management system 102, via the impact detection logic 122, may provide an indication of the impact via the GUI 110. The indication of the impact may be a notification or an updated version of a map indicating the modification. An example notification is described below in reference to FIG. 6.

Figure 4:
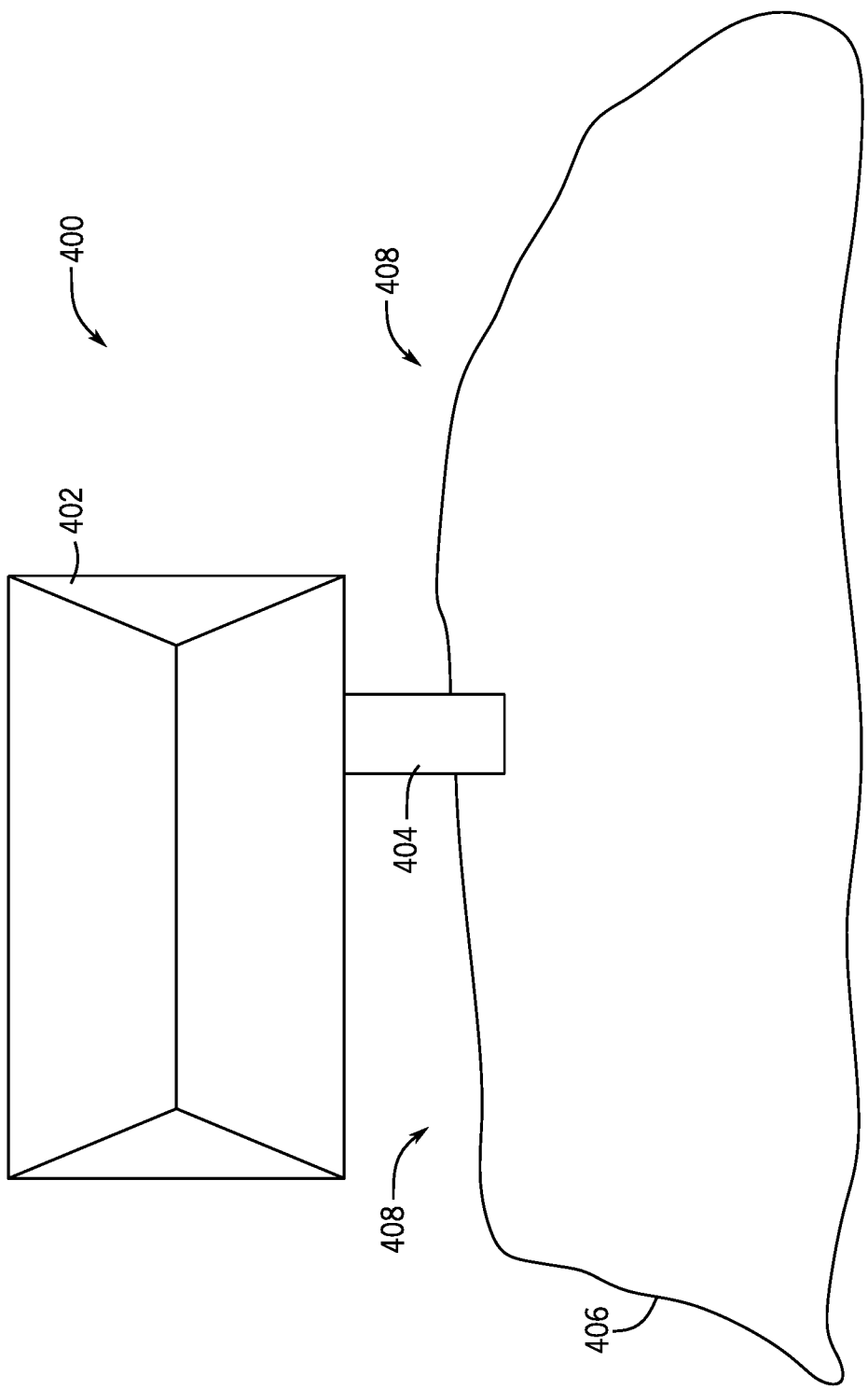
FIGS. 4 and 5 illustrate images of a target property that may be analyzed by the central management system of FIG. 1 to determine a modification of the target property and an impact of the modification, in accordance with embodiments described herein.
Figure 5:
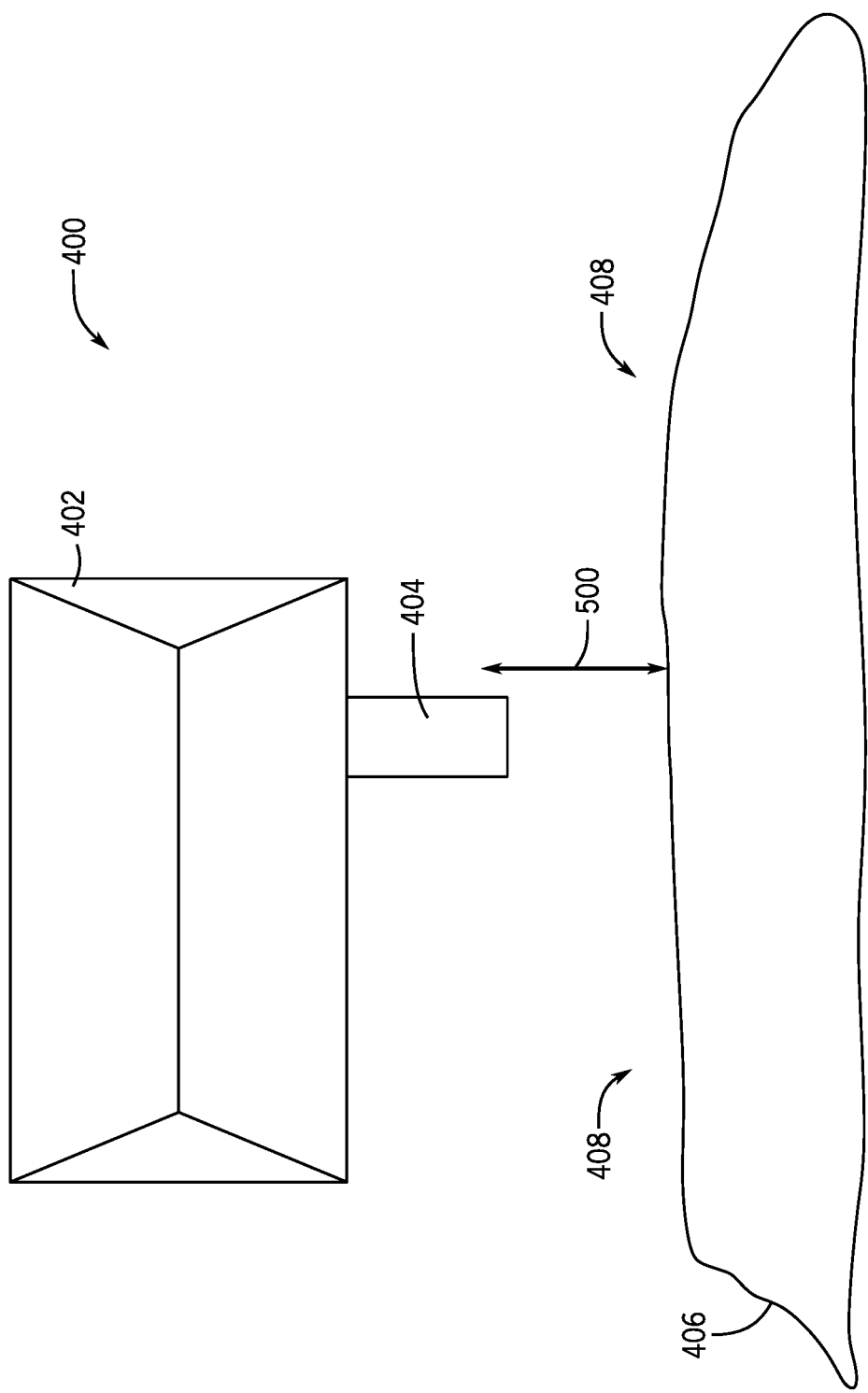

FIGS. 4 and 5 illustrate images of a target property 400 that may be analyzed by the central management system 102 of FIG. 1 to determine a modification of the target property 400 and an impact of the modification. As illustrated, the target property 400 includes a building 402 and a boat dock 404 extending from the building 402. The building 402 may be a house (e.g., a home), a boathouse (e.g., a house for storing a boat or supplies related to a boat), or another suitable structure. The boat dock 404 extends into a body of water 406 and is configured to provide service for a boat, such as to allow the boat to dock adjacent to a shoreline 408 of the body of water 406. The central management system 102, via the mapping modification detection logic 120, may receive mapping data including the image illustrated in FIG. 4 and identify, via machine learning, that the shoreline 408 is a geographic characteristic of interest that is specific to the target property 400. For example, the mapping modification detection logic 120 may determine that the shoreline 408 is an area of interest to one or more parties and/or that a status of the shoreline 408 (e.g., a position of the shoreline relative to the building 402 and/or the dock 404) may affect a value of the target property 400. In certain embodiments, the central management system 102 may provide an indication of the shoreline 408 being a geographic characteristic of interest to the GUI 110 for viewing and/or approval/rejection by a user (e.g., an owner of the target property 400 or another interested party (e.g., a renter of the target property 400, an owner of a boat, a renter of a boat)).

Additionally, the central management system 102, via the mapping modification detection logic 120, may receive additional mapping data including the image illustrated in FIG. 5 and identify, via machine learning, that the shoreline 408 is still a geographic characteristic of interest. As illustrated, the shoreline 408 has moved away from the building 402 and the dock 404 by a distance 500 (e.g., a modified water level). The mapping modification detection logic 120 may detect a modification of the geographic characteristic based on the additional mapping data (e.g., the modification being the shoreline 408 receding by the distance 500).

The central management system 102, via the impact detection logic 122, may determine an impact of the modification to the geographic characteristic of interest of the target property 400. More specifically, in the illustrated embodiment, the impact detection logic 122 may determine that the shoreline 408 receding by the distance 500 decreases a value of the target property 400 by a specified amount. Additionally or alternatively, the impact detection logic 122 may determine other impacts relative to the target property 400, such as an owner of a boat that previously the dock 404 for access to the body of water 406 no longer having access to the body of water 406 due to the recession in the shoreline 408.

The central management system 102, via the impact detection logic 122, may provide an indication of the impact via the GUI 110, such as by displaying a map indicating the modification of the geographic characteristic, the impact of the modification, and/or the impact of the modification overlaid on the map. In certain embodiments, the indication may include the embodiment of the GUI 110 illustrated in FIG. 6. As illustrated, FIG. 6 includes a notification 600 related to the target property 400 of FIGS. 4 and 5 that may be generated by the central management system 102 and displayed via the GUI 110. The notification 600 includes an alert box 602 indicating the modification of the target property 400, a description 604 of the modification, a description 606 of the impact of the modification, a recommendation 608 for addressing the modification and the impact, and a prompt 610 allowing user interaction with the notification 600. The prompt 610 includes selectable options 612 allowing the user to approve or reject a recommended course of action (e.g., to remove a listing to sell the target property 400). In certain embodiments, the central management system 102 may provide, via the GUI 110, a map of the target property 400 including the notification 600 overlaid on the map. Accordingly, the central management system 102 may generate the notification 600 to notify an owner of the target property 400 of the modification and the impact and to allow the owner to take an action related to the modification and the impact. Without the notification 600, and without the central management system 102 generally, the owner may be unaware of the modification and the impact, such that the central management system 102 may facilitate determination and communication of the modification and the impact to the owner.

The body of water 406 may be a lake, an ocean, a sea, a river, a pond, or another suitable body of water. In certain embodiments, the central management system 102 may determine that the recession of the shoreline 408 is a predictable and periodic occurrence and provide an indication of this determination. For example, the central management system 102 may determine that in one month each year, the shoreline 408 recedes by approximately the distance 500 of FIG. 5, and that the shoreline 408 returns to a normal level generally shown in FIG. 4 in other months of each year. The central management system 102 may determine that a value of the target property decreases in the month when the shoreline 408 is the position shown in FIG. 5 and provide a notification, similar to that shown in FIG. 6, recommending to the owner that the target property 400 should not be sold in that month.

In certain embodiments, the central management system 102 may adjust an asset protection plan associated with the target property 400 (e.g., a home insurance plan, a boat insurance plan, a renter's insurance plan, or another insurance plan associated with the target property 400) based on the determination of the modification and/or the impact. For example, based on the shoreline 408 receding by the distance 500, the central management system 102 may determine that the building 402 is at a lesser risk of flooding and may reduce a premium and/or a deductible of an asset protection plan associated with the building 402. In some embodiments, the central management system 102 may reduce the premium and/or the deductible of the asset protection plan associated with the building 402 only during the month(s) during which the building 402 is determined to be at a lesser risk of flooding. The central management system 102 may update a user profile including information about the asset protection plan and store the updated user profile in the user profile database 106.

In some embodiments, the central management system 102 may determine a modification of the target property 400 including the shoreline 408 being closer to the building 402 based on additional mapping data that shows the shoreline 408 closer to the building 402 relative to FIG. 4. The closer shoreline 408 may indicate an increased water level of the body of water 406. Based on the determined modification, the central management system 102 may determine that an impact to target property 400 includes increased access to the body of water 406 by a boat, and, based on the impact, may determine that a value of the target property 400 increased or decreased. In some embodiments, the central management system 102 may determine that an impact to target property 400 includes a greater risk of flooding of the building 402. Accordingly, the central management system 102 may determine that the building 402 is at a greater risk of flooding and may increase a premium and/or a deductible of an asset protection plan associated with the building 402. In some embodiments, the central management system 102 may increase the premium and/or the deductible of the asset protection plan associated with the building 402 only during the month(s) during which the building 402 is determined to be at a greater risk of flooding.

Figure 7:
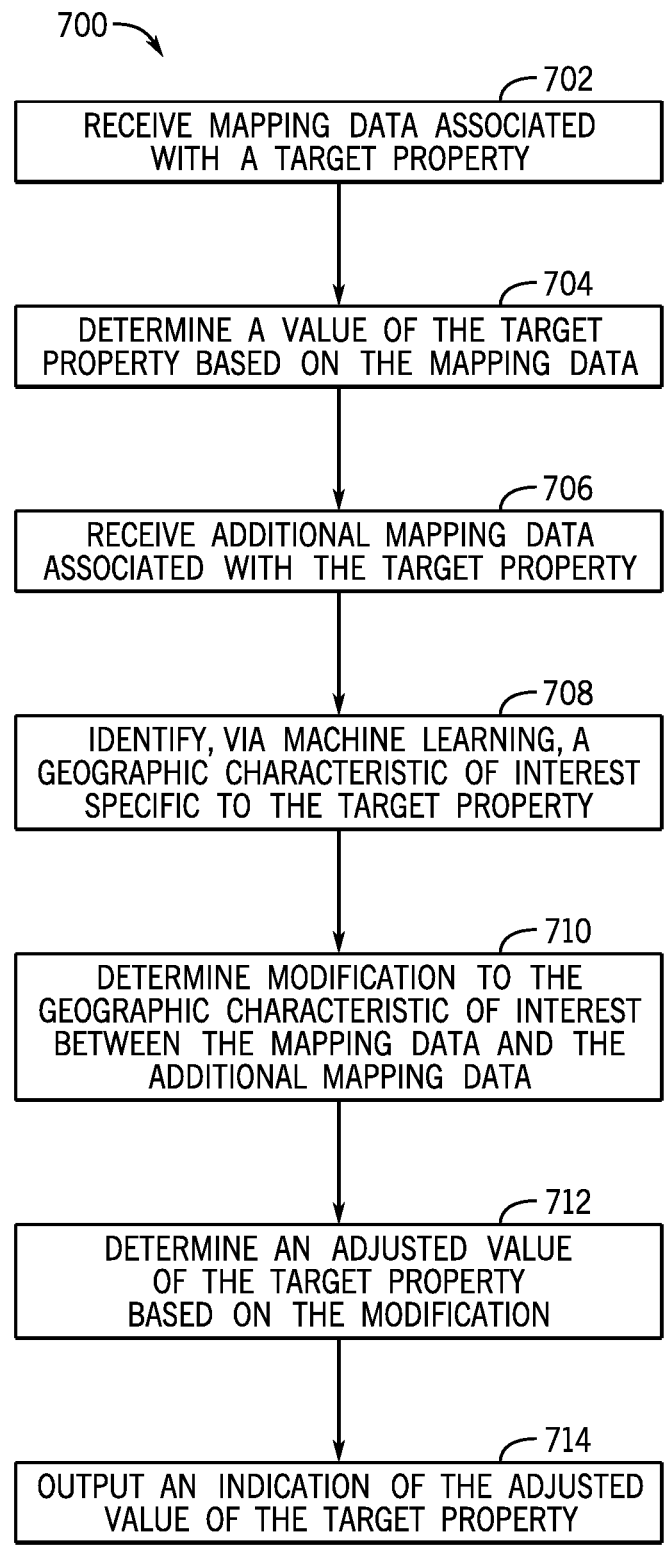
FIG. 7 illustrates a flow chart of a method for identifying the impact of the modification to the target property of FIGS. 4 and 5 and an adjusted value of the target property based on the modification, in accordance with embodiments described herein.

FIG. 7 illustrates a flow chart of a method 700 for identifying the impact of the modification to the target property 400 of FIGS. 4 and 5 and an adjusted value of the target property 400 based on the modification. The following description of the method 700 will be described as being performed by the central management system 102, but it should be noted that any suitable processor-based device may be specially programmed to perform any of the methods described herein. Moreover, although the following description of the method 700 is described as including certain steps performed in a particular order, it should be understood that the steps of the method 700 may be performed in any suitable order, that certain steps may be omitted, and/or that certain steps may be added.

At block 702, the central management system 102, via the mapping modification detection logic 120, may receive mapping data associated with the target property 400. For example, the step of block 702 may be similar to the step of block 302 described above. The mapping data may include the image of the target property 400 of FIG. 4.

At block 704, the central management system 102, via the mapping modification detection logic 120, may determine a value of the target property 400 based on the mapping data. In reference to FIG. 4, the mapping modification detection logic 120 may determine a value of the target property 400 including the building 402, the dock 404, and/or other aspects of the target property 400.

At block 706, the central management system 102, via the mapping modification detection logic 120, may receive additional mapping data associated with the target property 400. The additional mapping data may include the image of the target property 400 of FIG. 5 (e.g., updated mapping data relative to the mapping data received at block 702).

At block 708, the central management system 102, via the mapping modification detection logic 120, may identify, via machine learning, a geographic characteristic of interest specific to the target property 400. For example, the step of block 708 may be similar to the step of block 304 of FIG. 3. In reference to the mapping data shown in FIGS. 4 and 5, the mapping modification detection logic 120 may determine that the shoreline 408 is a geographic characteristic of interest.

At block 710, the central management system 102, via the mapping modification detection logic 120, may determine a modification to the geographic characteristic of interest between the mapping data received at block 702 and the additional mapping data received at block 706. The step of block 710 may be similar to the step of block 306 of FIG. 3 and may generally include, for example, determining that the shoreline 408 has receded by the distance 500 in FIG. 5.

At block 712, the central management system 102, via the impact detection logic 122, may determine an adjusted value of the target property 400 based on the modification. For example, the adjusted value may be an increase or decrease to the value determined at block 704 based on the modification. In reference to FIGS. 4 and 5, the adjusted value may generally be a decrease in the value of the target property 400 due to the dock 404 no longer having access to the body of water 406 (e.g., a boat not being able to dock at the dock 404 while disposed in/on the body of water 406).

At block 714, the central management system 102, via the impact detection logic 122, may output an indication of the adjusted value of the target property 400. For example, the central management system 102 may provide a notification identifying a previous value of the target property 400, the adjusted value of the target property 400, and/or the reasoning for the adjustment (e.g., the modification to the geographic characteristic of interest).

Figure 8:
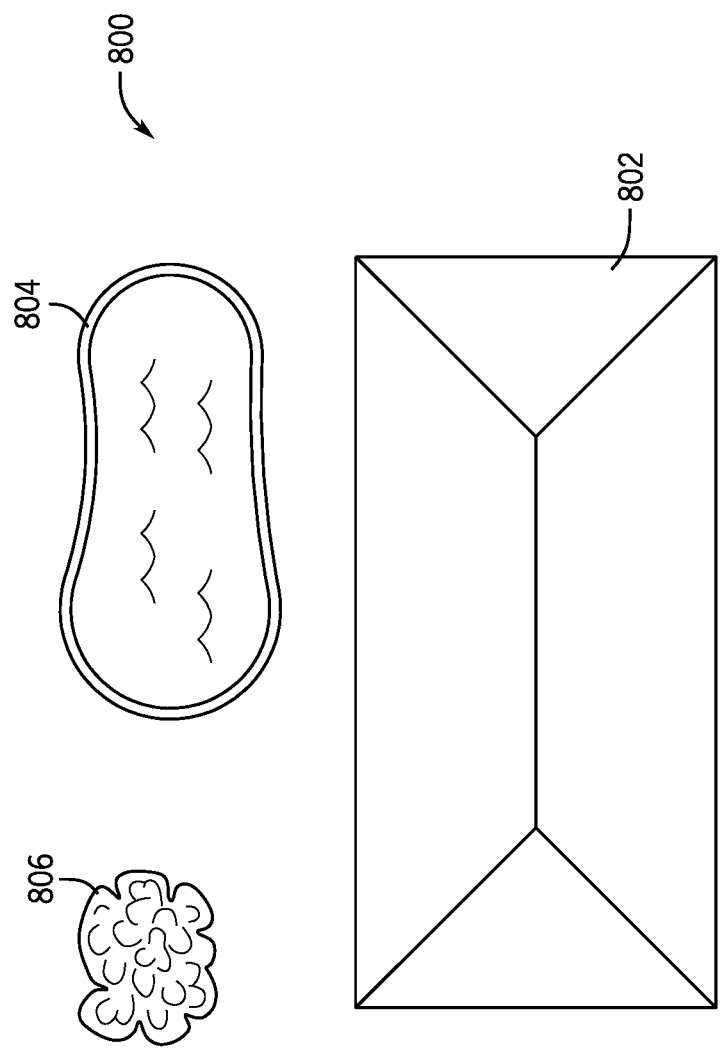
FIGS. 8 and 9 illustrate images of a target property that may be analyzed by the central management system of FIG. 1 to determine a modification of the target property and an impact of the modification, in accordance with embodiments described herein.
Figure 9:
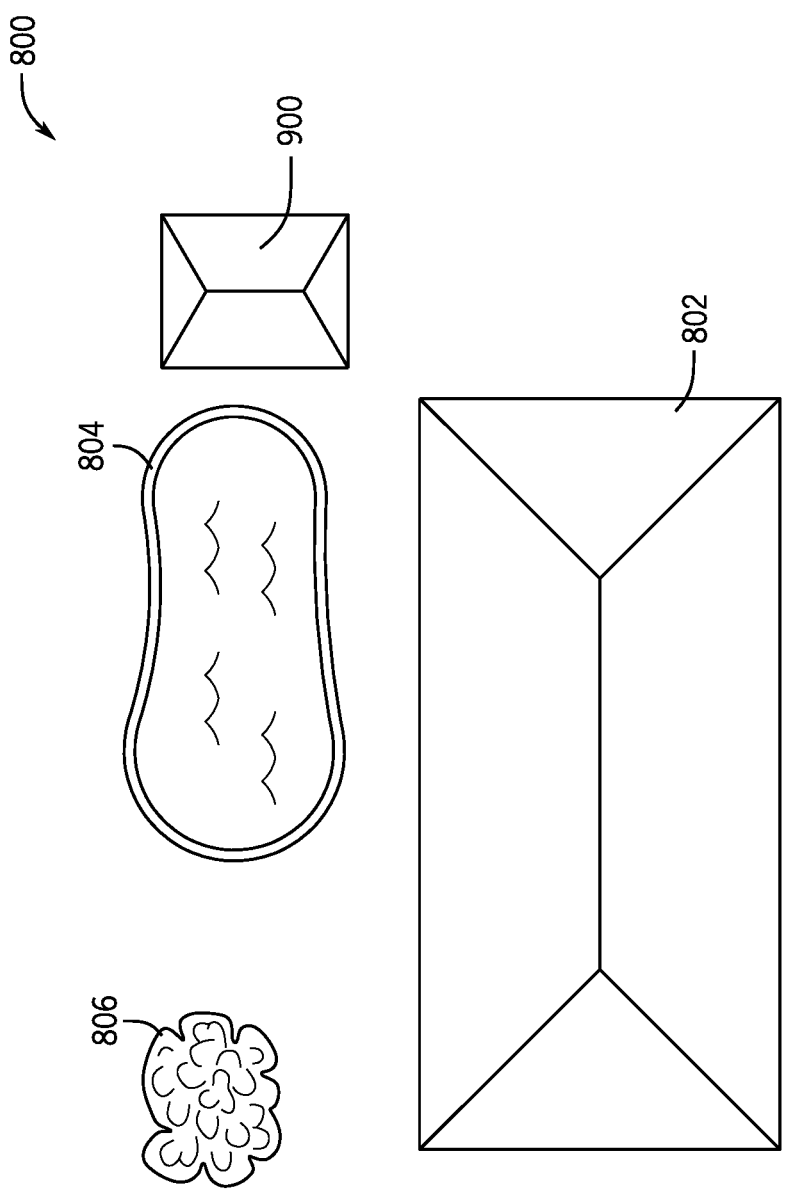

In another example, FIGS. 8 and 9 illustrate images of a target property 800 that may be analyzed by the central management system 102 of FIG. 1 to determine a modification of the target property 800 and an impact of the modification. As illustrated, the target property 800 includes a house 802, a pool 804, and a tree 806. The pool 804 and the tree 806 may generally be positioned in a back yard of the house 802 and/or adjacent to the house 802. The central management system 102, via the mapping modification detection logic 120, may receive mapping data including the image illustrated in FIG. 8 and identify, via machine learning, that a topography of the target property 800 is a geographic characteristic of interest that is specific to the target property 800. For example, the mapping modification detection logic 120 may determine that the topography is of interest to one or more parties and/or that a status of the topography (e.g., a positioning of the pool 804 and/or the tree 806, an amount of objects on the target property 800, an open space of the target property 800) may affect a value or status of the target property 800. In certain embodiments, the central management system 102 may provide an indication of the topography being a geographic characteristic of interest to the GUI 110 for viewing and/or approval/rejection by a user (e.g., an owner of the target property 800 or another interested party (e.g., a renter of the target property 800)).

In some embodiments, FIG. 8 may be indicative of a survey of the target property 800. The mapping data associated with the target property 800 received by the central management system 102 may include metadata and/or other information indicating that the mapping data is a survey. The central management system 102 may determine that the topography of the target property 800 is a geographic characteristic of interest in response to determining that the mapping data is a survey. For example, any potential modifications in the topography may be of interest to a party planning to buy or sell the target property 800.

Additionally, the central management system 102, via the mapping modification detection logic 120, may receive additional mapping data including the image illustrated in FIG. 9 and identify, via machine learning, that a building 900 has been added to the topography of the target property. As illustrated, the building 900 is positioned generally adjacent to the pool 804 and the tree 806. The mapping modification detection logic 120 may detect a modification of the geographic characteristic based on the additional mapping data (e.g., the modification being the building 900 being added to the topography of the target property 800).

The central management system 102, via the impact detection logic 122, may determine an impact of the modification to the geographic characteristic of interest of the target property 800. More specifically, in the illustrated embodiment, the impact detection logic 122 may determine that the building 900 being newly disposed (e.g., placed, built) on the target property 800 since the survey associated with FIG. 8 being performed requires a new survey of the target property 800. Additionally or alternatively, the impact detection logic 122 may determine other impacts relative to the target property 800.

The central management system 102, via the impact detection logic 122, may provide an indication of the impact via the GUI 110, such as by displaying a map indicating the modification of the geographic characteristic and/or the impact of the modification. In certain embodiments, the indication may include a map of FIG. 9 and information emphasizing the building 900. The central management system 102 automatically send a request to an appropriate service provider (e.g., a surveyor) to perform a new survey of the target property 800 in response to determining that the new survey is required. In some embodiments, the central management system 102 may provide a notification similar to FIG. 6 allowing a user to approve or decline an option to have a new survey performed.

Figure 10:
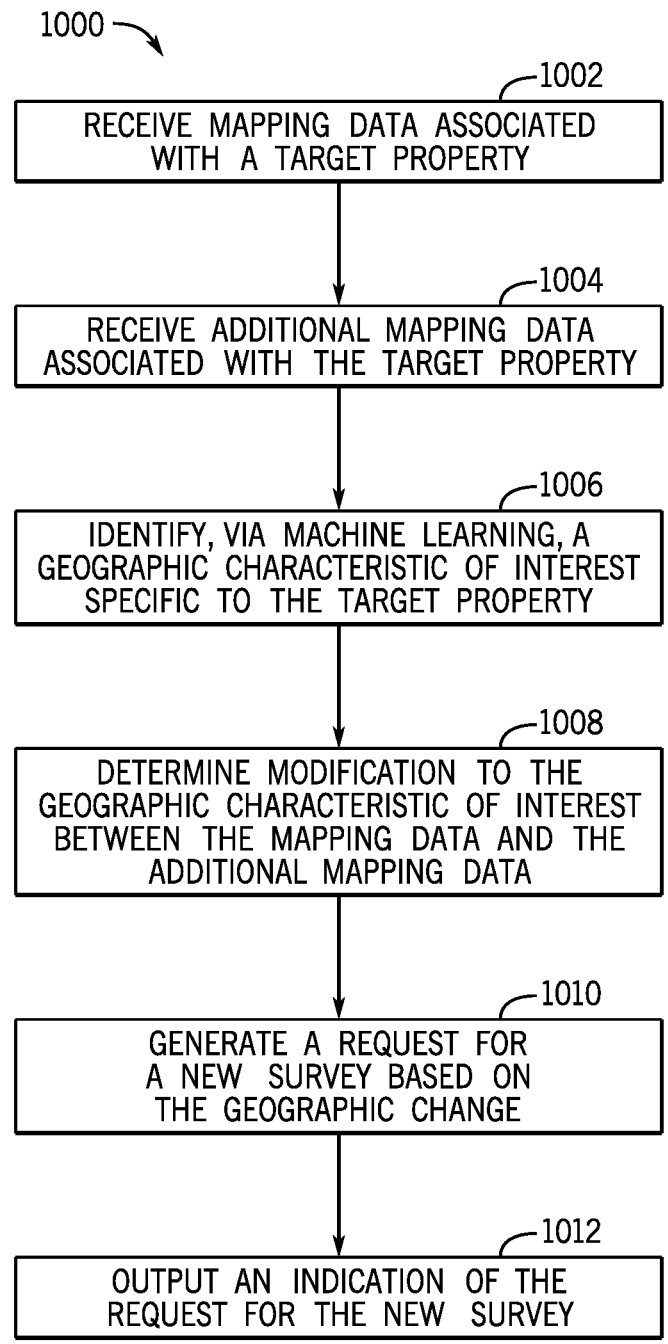
FIG. 10 illustrates a flow chart of a method for identifying the impact of the modification to the target property of FIGS. 8 and 9 and generating a request for a survey of the target property based on the modification, in accordance with embodiments described herein.

FIG. 10 illustrates a flow chart of a method 1000 for identifying the impact of the modification to the target property 800 of FIGS. 8 and 9 and generating a request for a survey of the target property 800 based on the modification. The following description of the method 1000 will be described as being performed by the central management system 102, but it should be noted that any suitable processor-based device may be specially programmed to perform any of the methods described herein. Moreover, although the following description of the method 1000 is described as including certain steps performed in a particular order, it should be understood that the steps of the method 1000 may be performed in any suitable order, that certain steps may be omitted, and/or that certain steps may be added.

At block 1002, the central management system 102, via the mapping modification detection logic 120, may receive mapping data associated with the target property 800. For example, the step of block 1002 may be similar to the step of block 302 described above. The mapping data may include the image of the target property 800 of FIG. 8.

At block 1004, the central management system 102, via the mapping modification detection logic 120, may receive additional mapping data associated with the target property 800. The additional mapping data may include the image of the target property 800 of FIG. 9 (e.g., updated mapping data relative to the mapping data received at block 1002).

At block 1006, the central management system 102, via the mapping modification detection logic 120, may identify, via machine learning, a geographic characteristic of interest specific to the target property 800. For example, the step of block 1006 may be similar to the step of block 304 of FIG. 3. In reference to the mapping data shown in FIGS. 8 and 9, the mapping modification detection logic 120 may determine that the topography of the target property 800 is a geographic characteristic of interest.

At block 1008, the central management system 102, via the mapping modification detection logic 120, may determine a modification to the geographic characteristic of interest between the mapping data received at block 1002 and the additional mapping data received at block 1004. The step of block 1008 may be similar to the step of block 306 of FIG. 3 and may generally include, for example, determining that the building 900 has been added to the target property 800 in FIG. 9.

At block 1010, the central management system 102, via the impact detection logic 122, may determine that a new survey is required and/or may be beneficial for a party interested in the target property 800 (e.g., a buyer, a seller). In response, the central management system 102 may automatically generate a request to perform a new survey.

At block 1012, the central management system 102, via the impact detection logic 122, may output an indication of the request to perform the new survey. For example, the central management system 102 may output the request to a service provider (e.g., a surveyor) and/or may provide a notification to an interested party indicating that the new survey may be required and/or beneficial.

Figure 11:
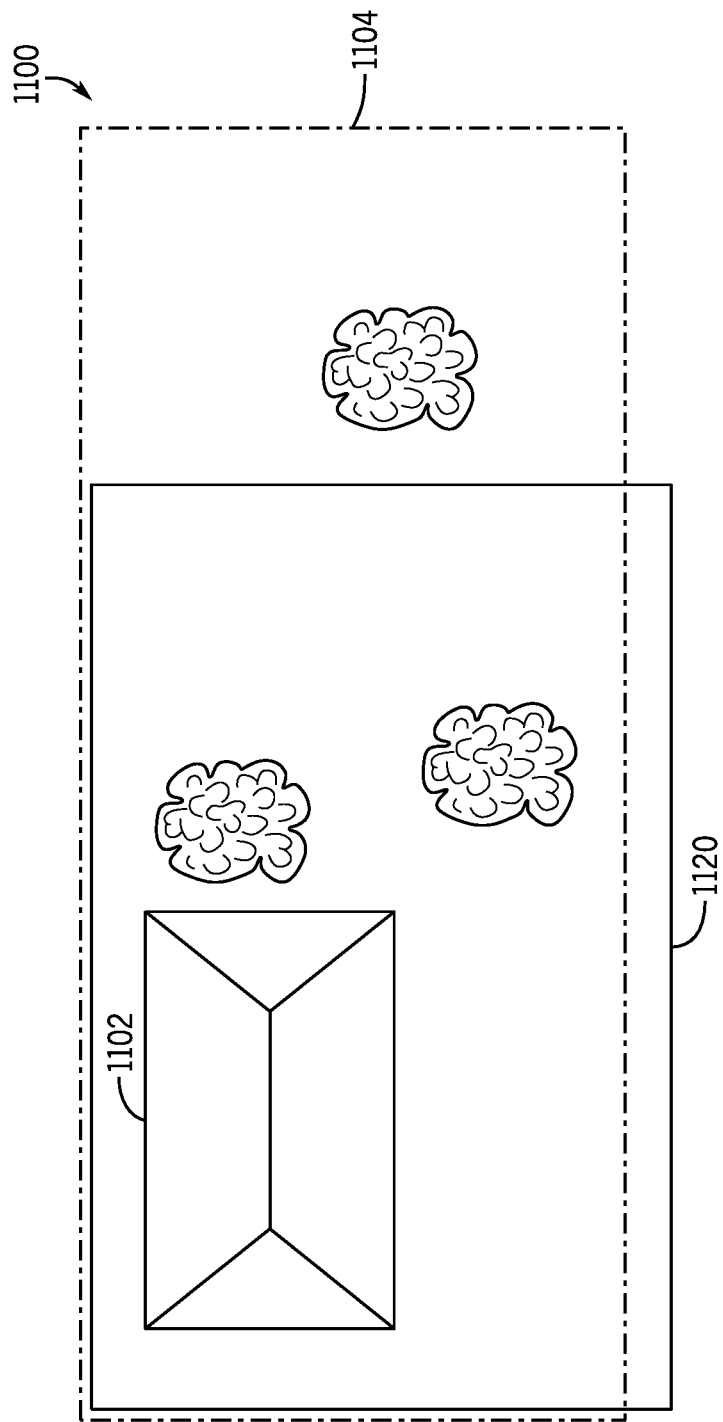
FIG. 11 illustrates an image of a target property that may be analyzed by the central management system of FIG. 1 to determine a modification of the target property and an impact of the modification, in accordance with embodiments described herein.

In another example embodiment, FIG. 11 illustrates an image of a target property 1100 that may be analyzed by the central management system 102 of FIG. 1 to determine a modification of the target property 1100 and an impact of the modification. As illustrated, the target property 1100 includes a house 1102 and a fence line 1104. The central management system 102, via the mapping modification detection logic 120, may receive mapping data including the image illustrated in FIG. 11 and identify, via machine learning, that the fence line 1104 of the target property 1100 is a geographic characteristic of interest that is specific to the target property 1100. For example, the mapping modification detection logic 120 may determine that a presence and/or a position of the fence line 1104 is of interest to one or more parties. In certain embodiments, the central management system 102 may provide an indication of the fence line 1104 being a geographic characteristic of interest to the GUI 110 for viewing and/or approval/rejection by a user (e.g., an owner of the target property 1100 or another interested party (e.g., a renter of the target property 1100)).

Additionally, the central management system 102, via the mapping modification detection logic 120, may identify a boundary 1120 of the target property 1100. For example, the boundary 1120 may be a documented boundary of the target property 1100, such as in a survey of the target property 1100. In certain embodiments, the central management system 102 retrieve a document and/or information indicating that the boundary 1120 is a legal boundary of the target property 1100, such as from a public records database.

The central management system 102, via the impact detection logic 122, may determine that the fence line 1104 (e.g., an actual boundary) differs from the boundary 1120 (e.g., a legal boundary, where the fence line 1104 should be). The central management system 102 may generate a notification indicative of the difference and notify interested parties. In certain embodiments, the central management system 102 may automatically generate and send a request to a company that may move the fence line 1104 to generally match the boundary 1120 and/or to be within the boundary 1120.

In some embodiments, an improper demarcation of the target property 1100, such as the fence line 1104 differing from the boundary 1120, may allow an owner of the target property 1100 to claim ownership of the entire area within the fence line 1104, even though the actual boundary of the target property 1100 is the boundary 1120. The owner may claim ownership of this additional portion after a certain length of time, such as 10 years. The length of time may depend on local rules, such as rules of a particular municipality, state, or nation. The rules may be statutory or may defined by case law. Additionally, such rules may be stored in the local rules database 108. The central management system 102 may retrieve the appropriate rules from the local rules database 108 and determine whether the owner may claim ownership of the additional portion of the target property 1100 within the fence line 1104. For example, the central management system 102 may analyze a series of images similar to FIG. 11 over time to determine how long the fence line 1104 has been positioned as illustrated in FIG. 11. In certain embodiments, the central management system 102 may provide (e.g., automatically provide) a notification via the GUI 110 indicative of the determination that the owner of the target property 1100 may claim ownership of the additional portion within the fence line 1104, a total length of time required to claim ownership under the local rules, a length of time remaining until the owner of the target property 1100 may claim ownership under the local rules, and/or additional information related to the local rules.

Figure 12:
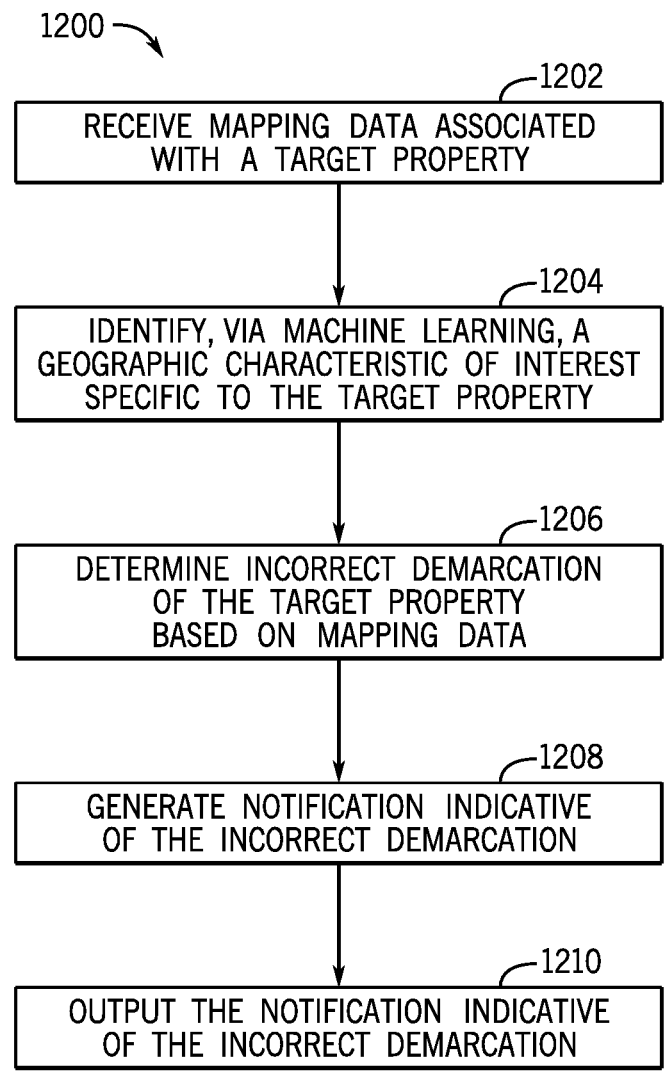
FIG. 12 illustrates a flow chart of a method for identifying the impact of the modification to the target property of FIG. 11 and generating a notification indicative of the impact to the target property based on the modification, in accordance with embodiments described herein.

FIG. 12 illustrates a flow chart of a method 1200 for identifying the impact of the modification to the target property 1100 of FIG. 11 and generating a notification indicative of the impact to the target property 1100 based on the modification. The following description of the method 1200 will be described as being performed by the central management system 102, but it should be noted that any suitable processor-based device may be specially programmed to perform any of the methods described herein. Moreover, although the following description of the method 1200 is described as including certain steps performed in a particular order, it should be understood that the steps of the method 1200 may be performed in any suitable order, that certain steps may be omitted, and/or that certain steps may be added.

At block 1202, the central management system 102, via the mapping modification detection logic 120, may receive mapping data associated with the target property 1100. For example, the step of block 1202 may be similar to the step of block 302 described above. The mapping data may include the image of the target property 1100 of FIG. 11.

At block 1204, the central management system 102, via the mapping modification detection logic 120, may identify, via machine learning, a geographic characteristic of interest specific to the target property 1100. For example, the step of block 1204 may be similar to the step of block 304 of FIG. 3. In reference to the mapping data shown in FIG. 11, the mapping modification detection logic 120 may determine that the fence line 1104 is a geographic characteristic of interest.

At block 1206, the central management system 102, via the mapping modification detection logic 120, may determine an incorrect demarcation of the target property 1100 based on the mapping data received at block 1206. For example, the central management system 102 may determine that the fence line 1104 differs from the boundary 1120. In some embodiments, the central management system 102 may compare the difference between the fence line 1104 and the boundary 1120 to a threshold difference. For example, the central management system 102 may compare a surface area (e.g., in square feet, square meters, acres) of the target property 1100 within the fence line 1104 to a surface area within the boundary 1120 and determine whether a difference in surface area exceeds a threshold difference. The central management system 102 may determine the threshold difference based on a type of the target property, amounts of the surface areas, local rules retrieved from the local rules database 108, and/or other suitable factors.

At block 1208, the central management system 102, via the impact detection logic 122, may generate a notification of the incorrect demarcation. In some embodiments, the notification may include an amount of the difference between the fence line 1104 and the boundary 1120. At block 1210, the central management system 102, via the impact detection logic 122, may output the notification, such as for display via the GUI 110.

Figure 13:
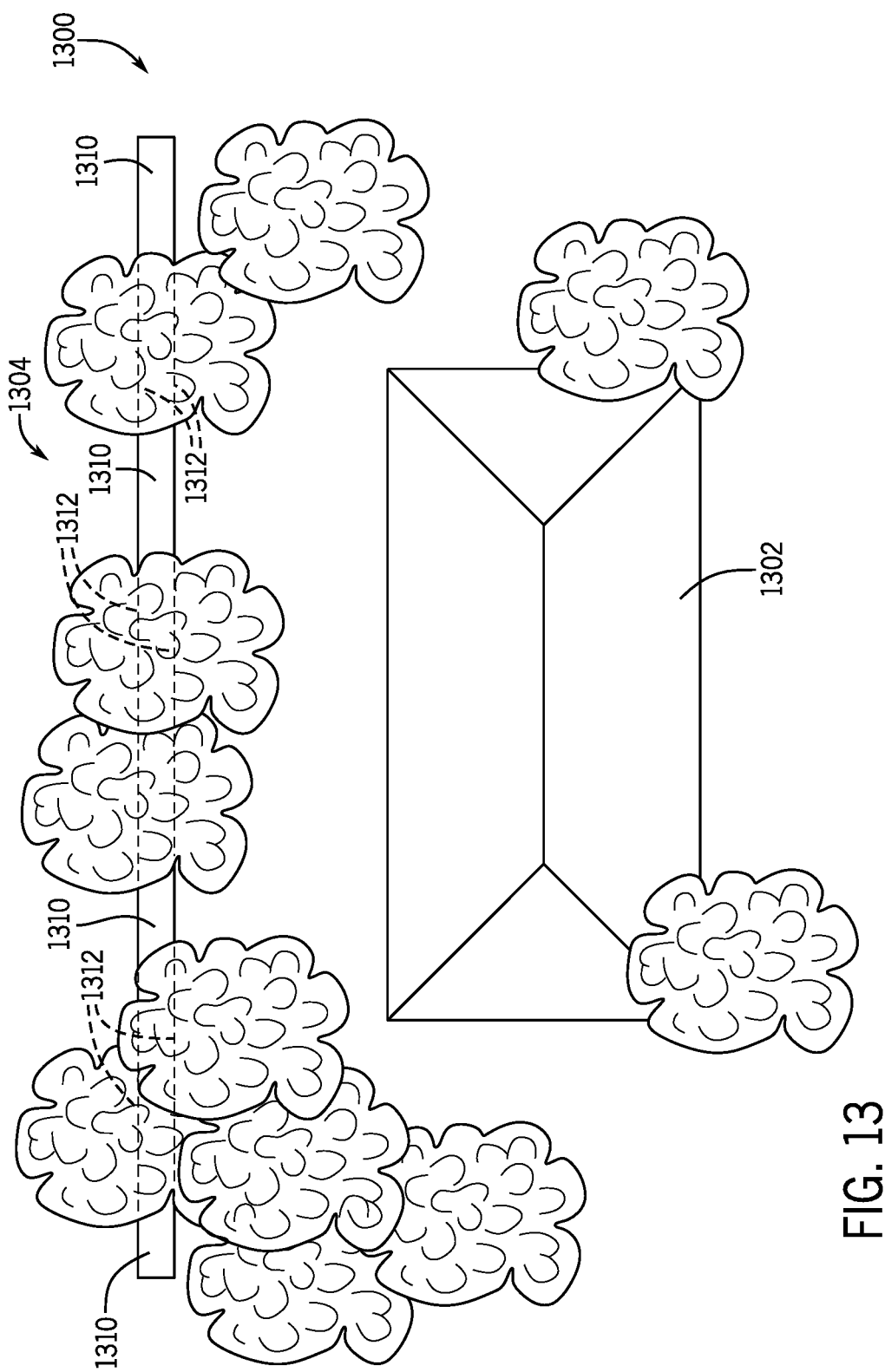
FIG. 13 illustrates an image of a target property that may be analyzed by the central management system of FIG. 1 to determine a modification of the target property and an impact of the modification, in accordance with embodiments described herein.

In another example embodiment, FIG. 13 illustrates an image of a target property 1300 that may be analyzed by the central management system 102 of FIG. 1 to determine a modification of the target property 1300 and an impact of the modification. As illustrated, the target property 1300 includes a house 1302 and a structure 1304. The central management system 102, via the mapping modification detection logic 120, may receive mapping data including the image illustrated in FIG. 13 and identify, via machine learning, that the structure 1304 of the target property 1300 is a geographic characteristic of interest that is specific to the target property 1300. For example, the mapping modification detection logic 120 may determine that a type, a presence, and/or a position of the structure 1304 is of interest to one or more parties. In certain embodiments, the central management system 102 may provide an indication of the structure 1304 being a geographic characteristic of interest to the GUI 110 for viewing and/or approval/rejection by a user (e.g., an owner of the target property 1300 or another interested party (e.g., a renter of the target property 1300)).

The mapping data received by the central management system 102 may only include/show visible portions 1310 of the structure 1304. The central management system 102 may also receive metadata identifying a context of the target property 1300 and determine a presence and/or shape of non-visible portions 1312 of the structure 1304 based on the context and the visible portions 1310 of the structure 1304. In some embodiments, the central management system 102 may determine the context based on features of the mapping data. In the illustrated embodiment, the central management system 102 may determine that the target property 1300 is a home property based on determining that the house 1302 is disposed on the target property 1300.

Based on the context, the central management system 102 may determine a type of the structure 1304 and/or the presence, positioning, and/or shape of the non-visible portions 1312. For example, based on determining that the target property 1300 is a home property, the central management system 102 may determine that the target property 1300 is likely to have a fence. Additionally, based on an aligned positioning of the visible portions 1310 of the structure 1304, the central management system 102 may determine that the structure 1304 is likely a fence. Accordingly, the central management system 102 may determine that the non-visible portions 1312 of the structure 1304 are present and interpolate a position/shape of the non-visible portions 1312, such as under the foliage depicted in FIG. 13. Based on the determination of the non-visible portions 1312 being present, the central management system 102 may generate and provide an updated mapping generally showing both the visible portions 1310 and the non-visible portions 1312 of the structure 1304.

In certain embodiments, the central management system 102 may use thermal imaging to identify the structure 1304 and/or other features of the target property 1300. For example, the mapping data may be thermal imaging that represents features of the target property 1300 based on thermal gradients between the features. In some embodiments, the thermal imaging may depict non-visible features, such as features under other features, and/or underground features, such as pipelines, oil, gas, and other suitable features. In certain embodiments, the underground features may be certain types of soil, such as soil that indicates a presence of oil or gas under the target property 1300, which may affect a value of the target property 1300. Accordingly, the central management system 102 may determine an adjusted value of the target property 1300 in response to and/or based on the detection of such features.

Figure 14:
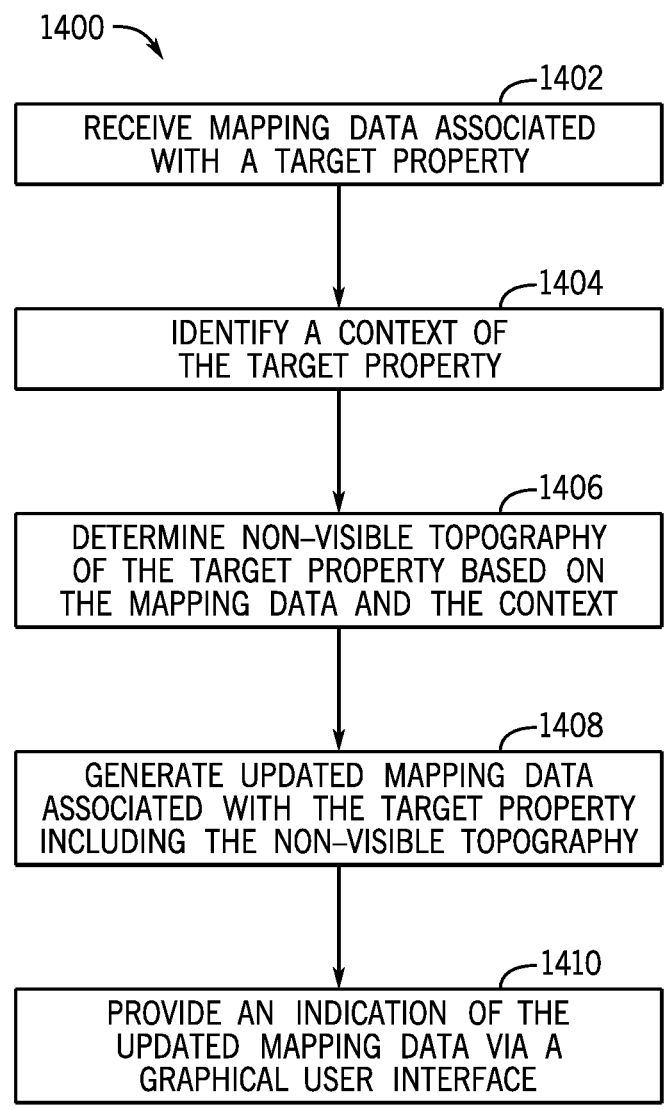
FIG. 14 illustrates a flow chart of a method for identifying the impact of the modification to the target property of FIG. 13 and generating updated mapping data indicative of the impact to the target property based on the modification, in accordance with embodiments described herein.

FIG. 14 illustrates a flow chart of a method 1400 for identifying the impact of the modification to the target property 1300 of FIG. 13 and generating updated mapping data indicative of the impact to the target property 1300 based on the modification. The following description of the method 1400 will be described as being performed by the central management system 102, but it should be noted that any suitable processor-based device may be specially programmed to perform any of the methods described herein. Moreover, although the following description of the method 1400 is described as including certain steps performed in a particular order, it should be understood that the steps of the method 1400 may be performed in any suitable order, that certain steps may be omitted, and/or that certain steps may be added.

At block 1402, the central management system 102, via the mapping modification detection logic 120, may receive mapping data associated with the target property 1300. For example, the step of block 1402 may be similar to the step of block 302 described above. The mapping data may include the image of the target property 1300 of FIG. 13.

At block 1404, the central management system 102, via the mapping modification detection logic 120, may identify, via machine learning, a context of the target property 1300. In certain embodiments, the central management system 102 may identify a context of the target property 1300 based on metadata associated with the mapping data, features of the mapping data, user input (e.g., a user identifying the context and/or features of the mapping data), and other suitable factors.

At block 1406, the central management system 102, via the mapping modification detection logic 120 and/or the impact detection logic 122, may determine a non-visible topography of the target property 1300 based on the mapping data and the context of the target property 1300. The non-visible topography may be hidden from view by soil, foliage, structures, and other features. For example, in reference to FIG. 13, the non-visible topography may include the non-visible portions 1312 of the structure 1304 and/or the structure 1304 generally.

At block 1408, the central management system 102, via the mapping modification detection logic 120 and/or the impact detection logic 122, may generate an updated mapping data associated with the target property 1300 including the non-visible topography. For example, in reference to FIG. 13, the updated mapping data may include an updated map indicating the non-visible portions 1312 of the structure 1304 (e.g., the updated map may include depictions of the non-visible portions 1312 overlaid on the foliage). At block 1410, the central management system 102, via the mapping modification detection logic 120 and/or the impact detection logic 122, may provide an indication of the updated mapping data via the GUI 110.

Accordingly, the impact analysis system, via the central management system described herein, may analyze mapping data associated with a target property and identify modifications to the target property and impacts of those modifications. The central management system may provide notifications indicative of the modifications and/or the impacts. Additionally, the central management system may automatically perform other actions based on the modifications and/or the impacts, such as sending a request to a service provider to perform an activity at the target property (e.g., send a request to a surveyor to perform a survey of the target property). As such, the impact analysis may facilitate identifying these modifications and impacts and notifying a party interested in the target property, such as an owner, buyer, seller, or renter.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A central management system comprising one or more processors configured to:
   retrieve mapping data from a mapping system associated with a target property, wherein the mapping data comprises satellite imagery;
   identify, via machine learning applied to the satellite imagery, a first geographic characteristic of interest specific to the target property, wherein the first geographic characteristic comprises a fence line, wherein at least a portion of the fence line is not visible in the satellite imagery, the at least portion of the fence line being identified via the machine learning;
   access and identify from a public records database a second geographic characteristic, wherein the second geographic characteristic is a legal boundary of the target property;
   determine a modification of the fence line based on previously determined locations of the fence line identified via the machine learning;
   identify an impact of the modification to the target property, wherein the modification to the target property comprises an incorrect demarcation of the legal boundary of the target property by the fence line; and
   provide an indication of the impact via a graphical user interface, wherein providing the indication of the impact comprises providing an electronic notification indicative of the incorrect demarcation via the graphical user interface.

2. The central management system of claim 1, wherein a third geographic characteristic of interest comprises a waterfront portion of the target property, wherein the modification to the target property comprises a modified water level at the waterfront portion, and wherein identifying the impact comprises determining an adjusted value of the target property based on the modified water level.

3. The central management system of claim 1, wherein the mapping data comprises imagery captured by an aerial drone, one or more maps, or a combination thereof.

4. The central management system of claim 1, wherein the modification comprises a new structure, modified landscaping, or both, and wherein identifying the impact comprises determining that a new survey of the target property is required.

5. The central management system of claim 4, wherein the one or more processors are configured to:
generate a request for the new survey in response to determining that the new survey is required; and
output an indication of the request.

6. The central management system of claim 1, wherein the indication of the impact comprises a map including an indication of the impact overlaid on the map.

7. The central management system of claim 6, wherein determining the modification of the first geographic characteristic of interest comprises determining a non-visible topography of the target property, and wherein providing the indication of the impact comprises providing the map including the non-visible topography via the graphical user interface.

8. The central management system of claim 1, wherein identifying the incorrect demarcation of the legal boundary of the target property enables an owner of the target property to claim ownership of an area within the fence line.

9. A method, comprising:
retrieving mapping data from a mapping system associated with a target property, wherein the mapping data comprises satellite imagery;
identifying, via machine learning applied to the satellite imagery, a geographic characteristic of interest specific to the target property, wherein the geographic characteristic comprises a fence line, wherein at least a portion of the fence line is not visible in the satellite imagery, the at least portion of the fence line being identified via the machine learning;
determining a modification of the fence line, wherein determining the modification of the fence line comprises determining a non-visible topography of the target property, wherein determining the non-visible topography comprises interpolating a position or shape of the non-visible topography based on previously determined locations of the fence line identified via the machine learning;
identifying an impact of the modification to the target property, wherein the modification to the target property comprises an adjusted demarcation of the legal boundary of the target property by the fence line; and
providing an indication of the impact via a graphical user interface, wherein providing the indication of the impact comprises providing an electronic notification indicative of the non-visible topography via the graphical user interface.

10. The method of claim 9, wherein identifying the impact comprises determining that a new survey of the target property is required based upon the adjusted demarcation of the target property.

11. The method of claim 10, comprising:
generating a request for the new survey in response to determining that the new survey is required; and
outputting an indication of the request.

12. The method of claim 9, wherein determining the modification of the geographic characteristic of interest comprises determining an incorrect demarcation of the target property, and wherein providing the indication of the impact comprises providing a notification indicative of the incorrect demarcation via the graphical user interface.

13. The method of claim 9, wherein the geographic characteristic of interest comprises a waterfront portion of the target property, wherein the modification to the target property comprises a modified water level at the waterfront portion, and wherein identifying the impact comprises determining an adjusted value of the target property based on the modified water level.

14. The method of claim 9, wherein the indication of the impact comprises a map including an indication of the impact overlaid on the map.

15. The method of claim 9, wherein identifying the adjusted demarcation of the legal boundary of the target property enables an owner of the target property to claim ownership of an area within the fence line.

16. A non-transitory computer-readable medium comprising computer readable instructions, that when executed by one or more processors, causes the one or more processors to perform operations comprising:
retrieving mapping data from a mapping system associated with a target property, wherein the mapping data comprises satellite imagery;
identifying, via machine learning applied to the satellite imagery, a geographic characteristic of interest specific to the target property, wherein the geographic characteristic comprises a fence line, wherein at least a portion of the fence line is not visible in the satellite imagery, the at least portion of the fence line being identified via the machine learning;
determining a modification of the fence line, wherein determining the modification of the fence line comprises determining a non-visible topography of the target property, wherein determining the non-visible topography comprises interpolating a position or shape of the non-visible topography based on previously determined locations of the fence line identified via the machine learning;
identifying an impact of the modification to the target property, wherein the modification to the target property comprises an adjusted demarcation of the legal boundary of the target property by the fence line; and
providing an indication of the impact via a graphical user interface, wherein providing the indication of the impact comprises providing an electronic notification indicative of the non-visible topography via the graphical user interface.

17. The non-transitory computer-readable medium of claim 16, wherein the geographic characteristic of interest comprises a waterfront portion of the target property, wherein the modification to the target property comprises a modified water level at the waterfront portion, and wherein identifying the impact comprises determining an adjusted value of the target property based on the modified water level.

18. The non-transitory computer-readable medium of claim 16, wherein the mapping data comprises imagery captured by an aerial drone, one or more maps, or a combination thereof.

19. The non-transitory computer-readable medium of claim 16, wherein the indication of the impact comprises a map including an indication of the impact overlaid on the map.

20. The non-transitory computer-readable medium of claim 16, wherein identifying the impact comprises determining that a new survey of the target property is required based upon the adjusted demarcation of the target property, and wherein the operations comprise:
   generating a request for the new survey in response to determining that the new survey is required; and
   outputting an indication of the request.

\* \* \* \* \*